US008319760B2

(12) United States Patent
Ino et al.

(10) Patent No.: US 8,319,760 B2
(45) Date of Patent: Nov. 27, 2012

(54) DISPLAY DEVICE, DRIVING METHOD OF THE SAME AND ELECTRONIC EQUIPMENT INCORPORATING THE SAME

(75) Inventors: Masumitsu Ino, Kanagawa (JP); Yasuhiro Ukai, Hyogo (JP)

(73) Assignee: Sony Corporation, Tokyo (JP)

( * ) Notice: Subject to any disclaimer, the term of this patent is extended or adjusted under 35 U.S.C. 154(b) by 1023 days.

(21) Appl. No.: 12/213,326

(22) Filed: Jun. 18, 2008

(65) Prior Publication Data

US 2009/0002307 A1 Jan. 1, 2009

(30) Foreign Application Priority Data

Jun. 29, 2007 (JP) ................................ 2007-171691
Apr. 30, 2008 (JP) ................................ 2008-119201

(51) Int. Cl.
*G06F 3/038* (2006.01)
(52) U.S. Cl. ...................................................... 345/204
(58) Field of Classification Search .................. 345/204
See application file for complete search history.

(56) References Cited

U.S. PATENT DOCUMENTS

| | | | | |
|---|---|---|---|---|
| 5,703,617 | A * | 12/1997 | Callahan et al. | 345/98 |
| 2003/0112230 | A1 * | 6/2003 | Maeda et al. | 345/204 |
| 2004/0150610 | A1 * | 8/2004 | Zebedee et al. | 345/100 |
| 2006/0055443 | A1 * | 3/2006 | Suzuki | 327/295 |

FOREIGN PATENT DOCUMENTS

| | | | |
|---|---|---|---|
| JP | 11-338438 | A | 12/1999 |
| JP | 2003-228349 | A | 8/2003 |
| JP | 2006-047425 | A | 2/2006 |
| JP | 2006-078505 | | 3/2006 |
| JP | 2006-086804 | A | 3/2006 |
| JP | 2007-102219 | A | 4/2007 |
| JP | 2007-164181 | A | 6/2007 |

OTHER PUBLICATIONS

Japanese Office Action issued Jan. 5, 2010 for corresponding Japanese Application No. 2008-119201.
Japanese Office Action Issued Oct. 20, 2009 for corresponding Japanese Application No. 2008-119201.
Japanese Office Action issued Jun. 12, 2012 for related Japanese Application No. 2010-141919.

* cited by examiner

*Primary Examiner* — Alexander Eisen
*Assistant Examiner* — Matthew Yeung
(74) *Attorney, Agent, or Firm* — Rader Fishman & Grauer, PLLC

(57) ABSTRACT

Disclosed herein is a display device including: a pixel section having pixel circuits arranged to form a matrix with at least a plurality of columns, pixel data being written to each of the pixel circuits via a switching element; at least one scan line disposed to be associated with rows of the pixel circuits and adapted to control the conduction of the switching elements; a plurality of signal lines disposed to be associated with columns of the pixel circuits and adapted to convey the pixel data; and a horizontal driving circuit having a plurality of signal drivers, the plurality of signal drivers being associated with a plurality of groups into which the signal lines are divided, and being adapted to convey the image data supplied to the signal lines.

9 Claims, 11 Drawing Sheets

DISPLAY DEVICE, DRIVING METHOD OF THE SAME AND ELECTRONIC EQUIPMENT INCORPORATING THE SAME

CROSS REFERENCES TO RELATED APPLICATIONS

The present invention contains subject matter related to Japanese Patent Application JP 2007-171691 filed in the Japan Patent Office on Jun. 29, 2007 and to Japanese Patent Application JP 2008-119201 filed in the Japan Patent Office on Apr. 30, 2008, the entire contents of which being incorporated herein by reference.

BACKGROUND OF THE INVENTION

1. Field of the Invention

The present invention relates to a display device having thin film transistors serving as switching elements formed on a transparent insulating substrate and to a driving method of the same and electronic equipment incorporating the same, and particularly to an improvement of a signal line driving technique.

2. Description of the Related Art

Display devices such as liquid crystal display devices (liquid crystal displays) using liquid crystal cells as pixel display elements (electro-optical elements) are active matrix image displays. Display devices of this type are designed to display an output image via a liquid crystal display surface.

Thanks to their slimness and low power consumption, liquid crystal display devices have found application in a variety of electronic equipment including mobile information terminals (personal digital assistant: PDA), mobile phones, digital cameras, video cameras, and computer display devices.

Incidentally, screen flickering is typically not perceivable by human eyes if the image frame rate is 60 Hz or higher.

At this frequency, however, blurriness in moving images as well as still images is perceivable by humans.

To provide an improvement to this problem, namely, eliminating blurriness in a moving image, a frame frequency of 240 Hz, four times higher than 60 Hz, is desired as disclosed, for example, in Japanese Patent Laid-Open No. 2006-78505 (hereinafter referred to as Patent Document 1).

As for the writing scheme using thin film transistors (TFTs), the display method disclosed in Patent Document 1 writes a frame image in 1/240 of a second with pixels sequentially displayed from left. Alternatively, the display method performs a refresh in seemingly 1/240 of a second by shifting the time and writing to liquid crystals in 1/60 of a second (FIG. 21 in Patent Document 1).

On the other hand, a technique is disclosed in Japanese Patent Laid-Open No. Hei 11-338438 (hereinafter referred to as Patent Document 2) which allows for writing of video data at a data transfer rate of around MHz.

This liquid crystal display device stores a line of data in a memory circuit 2 via switch 1, as illustrated in FIG. 1. Then, during a next line interval, the same device selects red (R) video data from among red (R), green (G), and blue (B) video data while at the same time storing the video data in a memory circuit 3 using switches 4-1 to 4-3.

Then, the same device reads the R data for a single driver IC from the memory circuit via a switch 5-1 (or 5-2 or 5-3). The switches 5-1 to 5-3 are switched together with a switch 1. The same device writes the data to a driver IC 6-1 (or 6-2 or 6-3) and at the same time writes the data to another driver IC. The same device writes green (G) and blue (B) video data in the same manner. This allows different pieces of video data to be written to the respective driver ICs at the same time. A liquid crystal display panel 7 displays video based on the video data written to the driver ICs.

However, no description is made in the aforementioned Patent Document 1 as to the input timings (input method) of image signal data to data line drive circuits. No specific data writing system has been established for an image frame frequency of 240 Hz.

On the other hand, the technique disclosed in Patent Document 2 writes image data to the driver ICs 6-1 to 6-3 synchronously with each other. Further, the pieces of data supplied to the three driver ICs are synchronous with each other.

This condition leads to increased noise at the leading or trailing edge of the clock and image data between adjacent wirings, giving rise to a voltage fluctuation of the image data and clock signal themselves and making the data and clock unstable.

The input of deformed image data causes an error in the driver IC image data, significantly degrading the image quality. Waveform shaping by a buffer circuit produces a waveform prone to data error.

At a frequency beyond 100 MHz in particular, noise between adjacent wirings in a cable or printed board is hardly negligible.

Today, VGA (800×600 pixels) desires a clock frequency of 27 MHz, and 108 MHz at a high frame rate which is four times higher in speed.

Further, with UVGA (1600×1400 pixels), the minimum clock frequency is 135 MHz. The frequency four times greater than 135 MHz is 540 MHz, which is uncontrollable by an ordinary printed board.

This is the reason why division driving is desired. However, the driving of four or five divisions is considered to be the limit in terms of the scale of the panel system.

In this condition, a potential develops due to high frequency components arising from the parasitic capacitance between adjacent wirings adapted to supply signals to the driver ICs. This potential manifests itself as noise in the clock and image data, causing an error in the clock signal and image data and eventually degrading the panel image quality.

A purpose of the embodiment of the present invention is to provide a display device allowing for loading of high frequency image data without degrading the image quality, a driving method of the same, and electronic equipment incorporating the same.

SUMMARY OF THE INVENTION

A display device according to a first mode of the embodiment of the present invention includes a pixel section having pixel circuits arranged to form a matrix with at least a plurality of columns. Pixel data is written to each of the pixel circuits via a switching element. The display device further includes at least one scan line disposed to be associated with rows of the pixel circuits and adapted to control the conduction of the switching elements. The display device still further includes a plurality of signal lines disposed to be associated with columns of the pixel circuits and adapted to convey the pixel data. The display device still further includes a horizontal driving circuit having a plurality of signal drivers. The signal drivers are associated with a plurality of groups into which the signal lines are divided, and adapted to convey the image data supplied to the signal lines. Each of the plurality of signal drivers conveys the image data to the associated signal line in response to a separate drive pulse. The drive pulses supplied to the signal drivers are shifted in phase from each other.

Preferably, data is fed in a divided manner to the signal drivers adjacent to each other. Also preferably, the image data is fed to the signal drivers at timings synchronous with the drive pulses.

Preferably, the display device includes a multiphase clock data generator. Also preferably, the same generator divides in frequency the drive pulse at a higher-than-normal frequency so as to supply the drive pulses shifted in phase from each other to the signal drivers. Also preferably, the same generator divides the image data, rearranges the divided pieces of data into a data arrangement suitable for input to the signal drivers, and supplies these pieces of data.

Preferably, the multiphase clock data generator supplies the independent drive pulses, shifted in phase from each other, respectively to the signal drivers. Also preferably, the drive pulses each include a clock pulse and start pulse.

Preferably, a time interval Φ by which the drive pulses are shifted in phase from each other is set so as to satisfy the relationship $\Phi \leqq (T/2)/N$, where (T/2) is the half period of an image clock and N the number of frequency divisions.

Preferably, the display device includes a selector switch disposed between each of the signal drivers and its associated signal line. Also preferably, the selector switch is adapted to select the image data in a time-divided manner.

A driving method of a display device according to a second mode of the embodiment of the present invention is a driving method of a display device which includes a pixel section having pixel circuits arranged to form a matrix with at least a plurality of columns. Pixel data is written to each of the pixel circuits via a switching element. The display device further includes at least one scan line disposed to be associated with rows of the pixel circuits and adapted to control the conduction of the switching element. The display device still further includes a plurality of signal lines disposed to be associated with columns of the pixel circuits and adapted to convey the pixel data. The display device still further includes a horizontal driving circuit having a plurality of signal drivers. The signal drivers are associated with a plurality of groups into which the signal lines are divided, and adapted to convey the image data supplied to the signal lines. The driving method supplies separate drive pulses, shifted in phase from each other, to the plurality of signal drivers so that each of the signal drivers conveys the image data to the associated signal line in response to the drive pulse received.

A third mode of the embodiment of the present invention is electronic equipment incorporating a display device. The display device includes a pixel section having pixel circuits arranged to form a matrix with at least a plurality of columns. Pixel data is written to each of the pixel circuits via a switching element. The display device further includes at least one scan line disposed to be associated with rows of the pixel circuits and adapted to control the conduction of the switching element. The display device still further includes a plurality of signal lines disposed to be associated with with the clock pulses, start pulses, and image data at lower-than-original frequencies.

The reason why the horizontal driving circuit 130A is driven as described above in the present embodiment will be described below.

Screen flickering is typically not perceivable by human eyes if the image frame rate is 60 Hz or higher.

At this frequency, however, blurriness in moving images as well as still images is perceivable by humans.

In order to provide an improvement to this problem, a frame frequency of 240 Hz is desired to eliminate blurriness in moving images.

Therefore, if an active matrix display device has a problem with its moving image characteristics today, such characteristics are improved by displaying images with the number of frames displayed per second four times greater than normal and at a frame frequency four times greater than normal. The normal frame frequency is 60 Hz. Therefore, the four-fold frame frequency is 240 Hz. columns of the pixel circuits and adapted to convey the pixel data. The display device still further includes a horizontal driving circuit having a plurality of signal drivers. The signal drivers are associated with a plurality of groups into which the signal lines are divided, and adapted to convey the image data supplied to the signal lines. Each of the plurality of signal drivers conveys the image data to the associated signal line in response to a separate drive pulse. The drive pulses supplied to the signal drivers are shifted in phase from each other.

The embodiment of the present invention supplies the separate drive pulses, shifted in phase from each other, to the plurality of signal drivers.

Each of the signal drivers conveys the image data to the signal line in response to the drive pulse received.

DETAILED DESCRIPTION OF THE PREFERRED EMBODIMENT

The embodiment of the present invention multiplexes a control clock, start pulse, serving as a synchronizing signal, and image data, and it generates multiphase pulses, thus permitting loading of high-frequency image data in such a manner as not to degrade the image quality.

A typical horizontal driving circuit will be described before describing the embodiment of the present invention.

Figure 1:
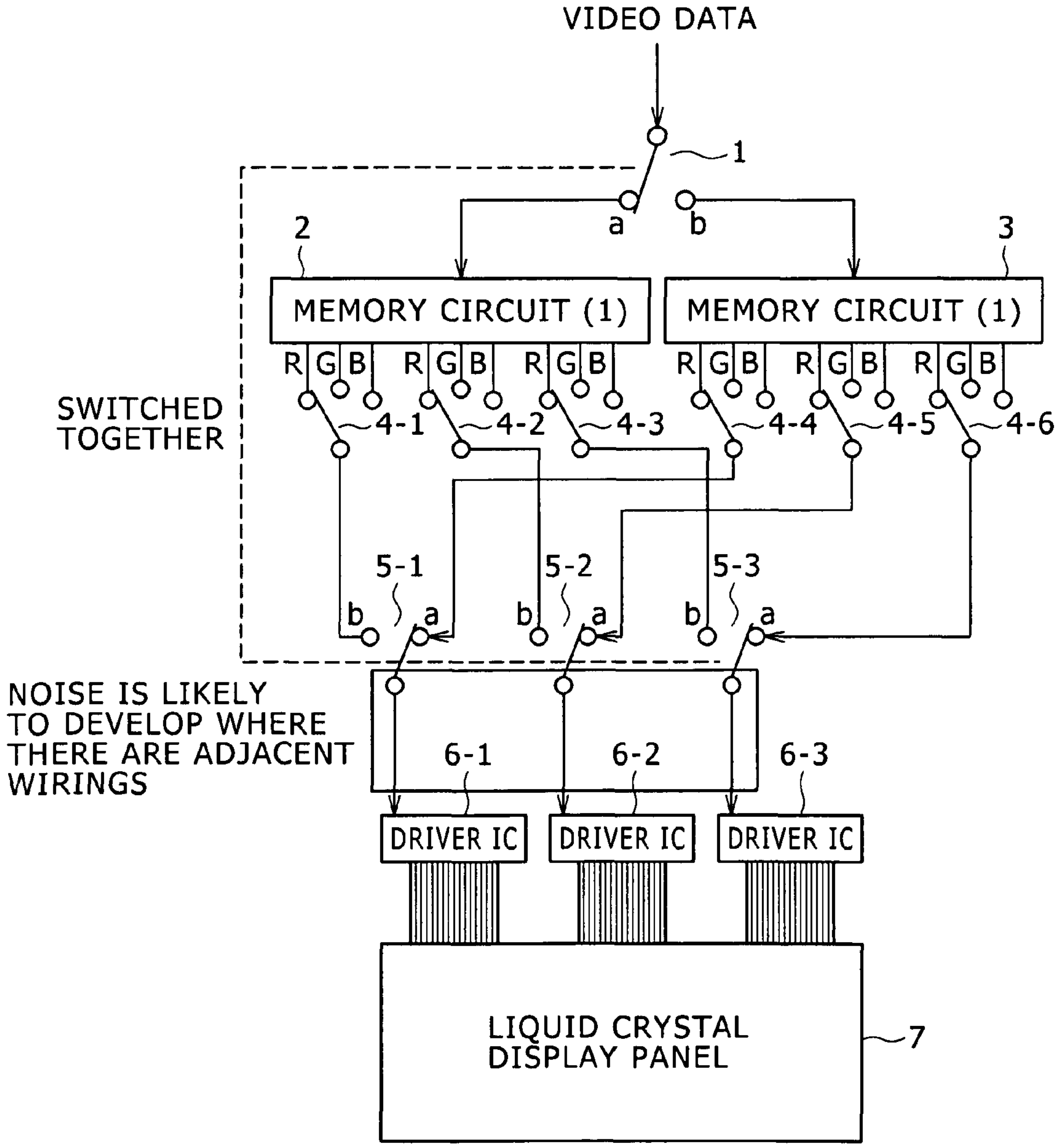
FIG. 1 is a diagram describing the related art allowing for writing of video data at a data transfer rate of around 200 MHz.
Figure 2:
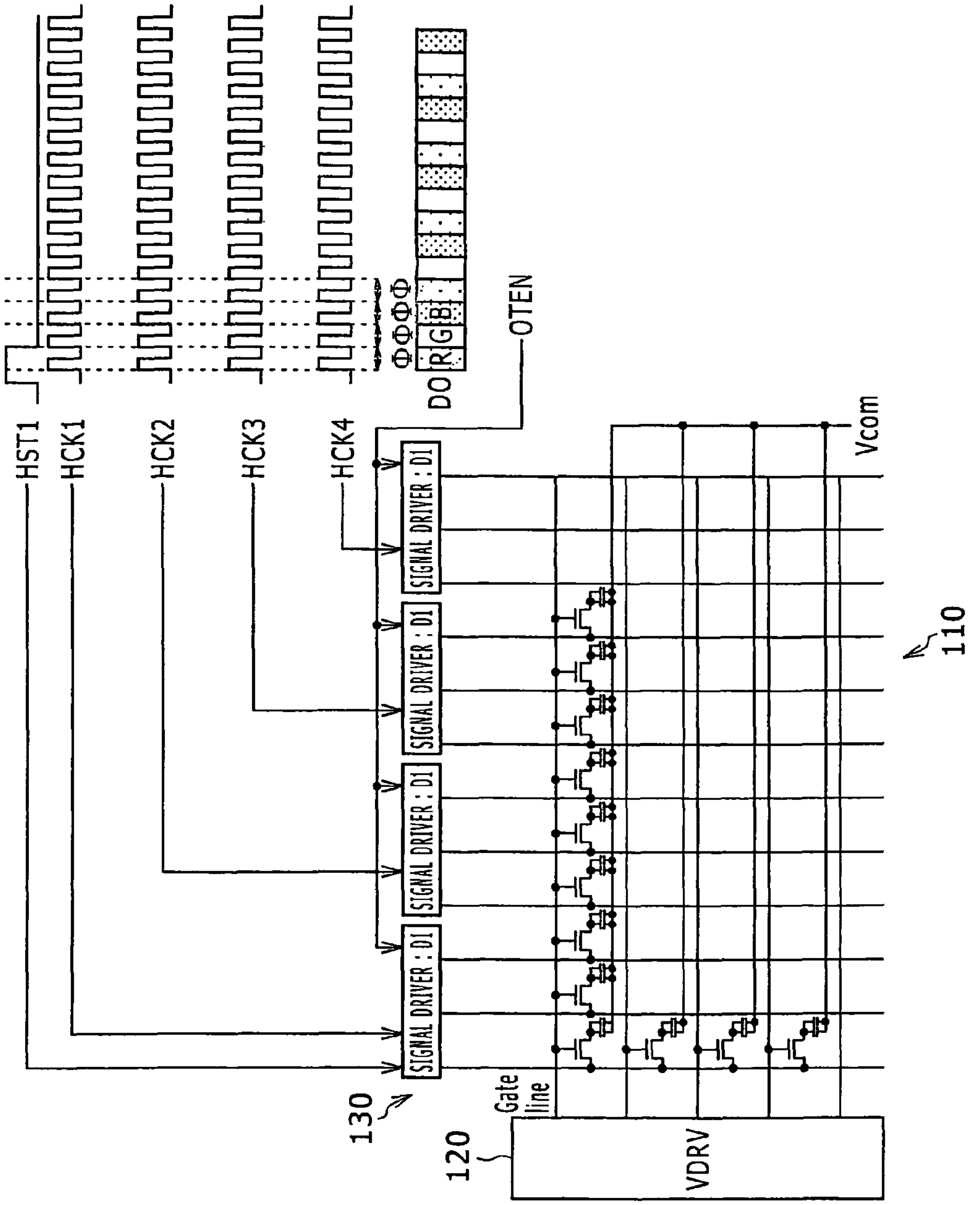
FIG. 2 is a diagram illustrating, as a comparative example of a present embodiment, an example of drive pulses supplied to signal drivers of a typical horizontal driving circuit.

FIG. 2 is a diagram illustrating, as a comparative example of the present embodiment, an example of drive pulses supplied to signal drivers of a typical horizontal driving circuit 130. In this case, the signal drivers are divided into four horizontal display areas, with the image data fed at a four-fold frequency.

In this example, the image signal data is loaded by a single control clock, as is clear from FIG. 2. As a result, the signal drivers have to process the control clock as an input pulse at a data frequency synchronous with a moving image clock.

Even if an attempt is made to input the image data at a four-fold frequency in this condition to achieve a high-frame-rate display, the image data may not be fed to the liquid crystal display device. The reason for this is that the response capability of the signal driver ICs and the impedance of the cable lines adapted to convey the image data are not suitable for the high frequency.

Figure 3:
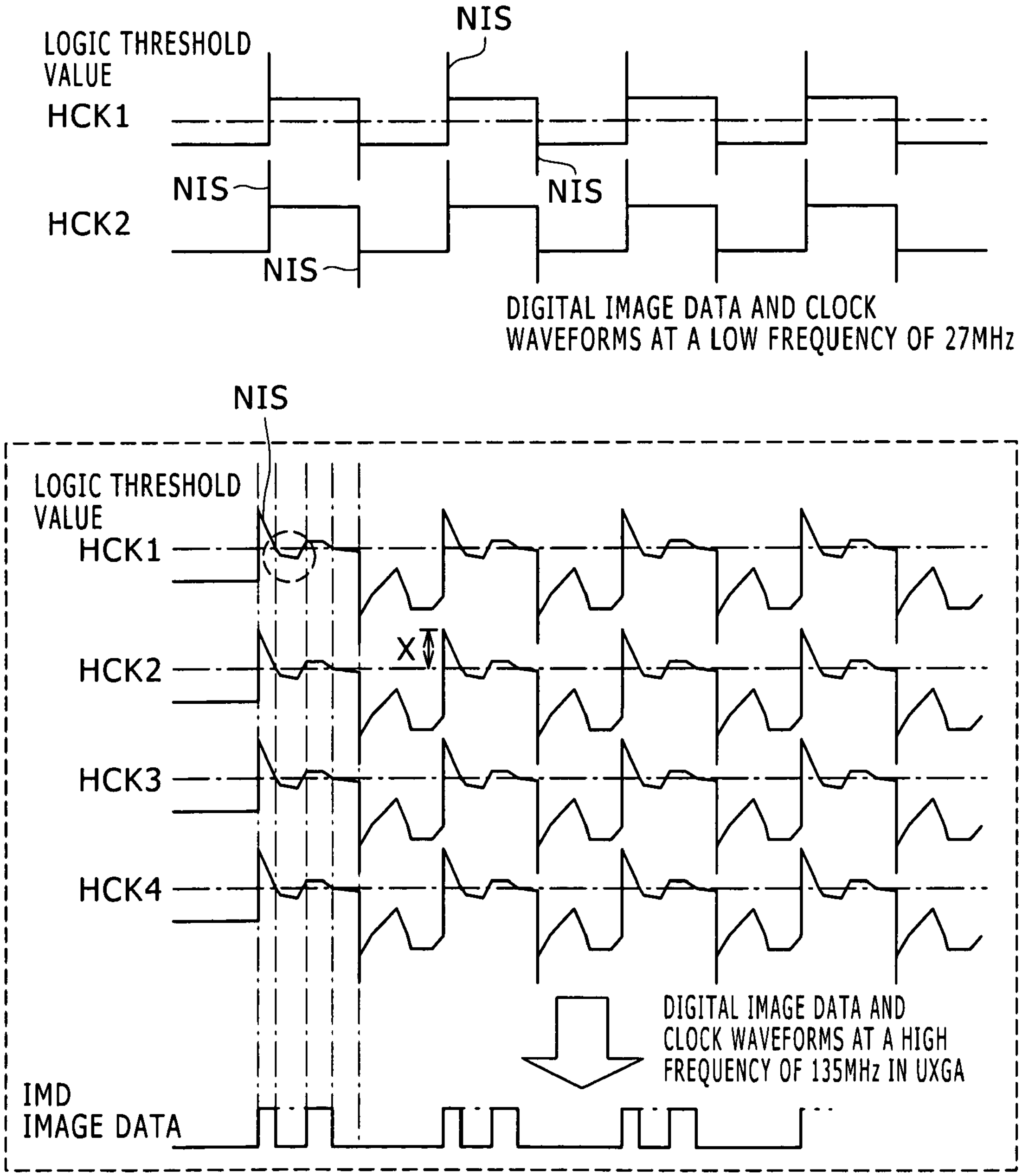
FIG. 3 is a diagram describing the problems of the drive pulses in FIG. 2.

Further, as illustrated in FIG. 3, noise caused by interference resulting from parasitic capacitance between signal lines at high frequency adversely affects the clock pulse itself as well as the image data, which may make it impossible to display an image properly.

That is, the pieces of data supplied to the driver ICs are in phase with each other. This condition leads to increased noise NIS at the leading or trailing edge of the image data and clock between adjacent wirings, giving rise to a voltage fluctuation of the image data and clock signal themselves and making the data and signal unstable. In the example shown in FIG. 3, the potential of the noise NIS in horizontal clock pulses HCK1, HCK2, HCK3, and HCK4 mutually grows, as shown, for example, by reference numeral X in FIG. 3. The clock pulses HCK1, HCK2, HCK3, and HCK4 are derived from a synchronizing signal. It should be noted that the normal waveform of image data IMD is shown by a dashed line and the error portion by a solid line in FIG. 3.

As a solution to this problem, it is necessary to bring down the frequency supplied to the signal drivers and shift the phases of the clock pulses HCK1, HCK2, HCK3, and HCK4 so as to prevent the noise from growing. Incidentally, in VGA, the clock frequency is 27 MHz at a frame frequency of 60 Hz, and the clock frequency is 108 MHz at a four-fold frame frequency of 240 Hz.

In order to address the problem described above, the present embodiment multiplexes the control clock, start pulse serving as a synchronizing signal and image data and generates multiphase pulses, thus permitting loading of the aforementioned high-frequency image data.

The present embodiment will be described in detail below with reference to the accompanying drawings.

Figure 4:
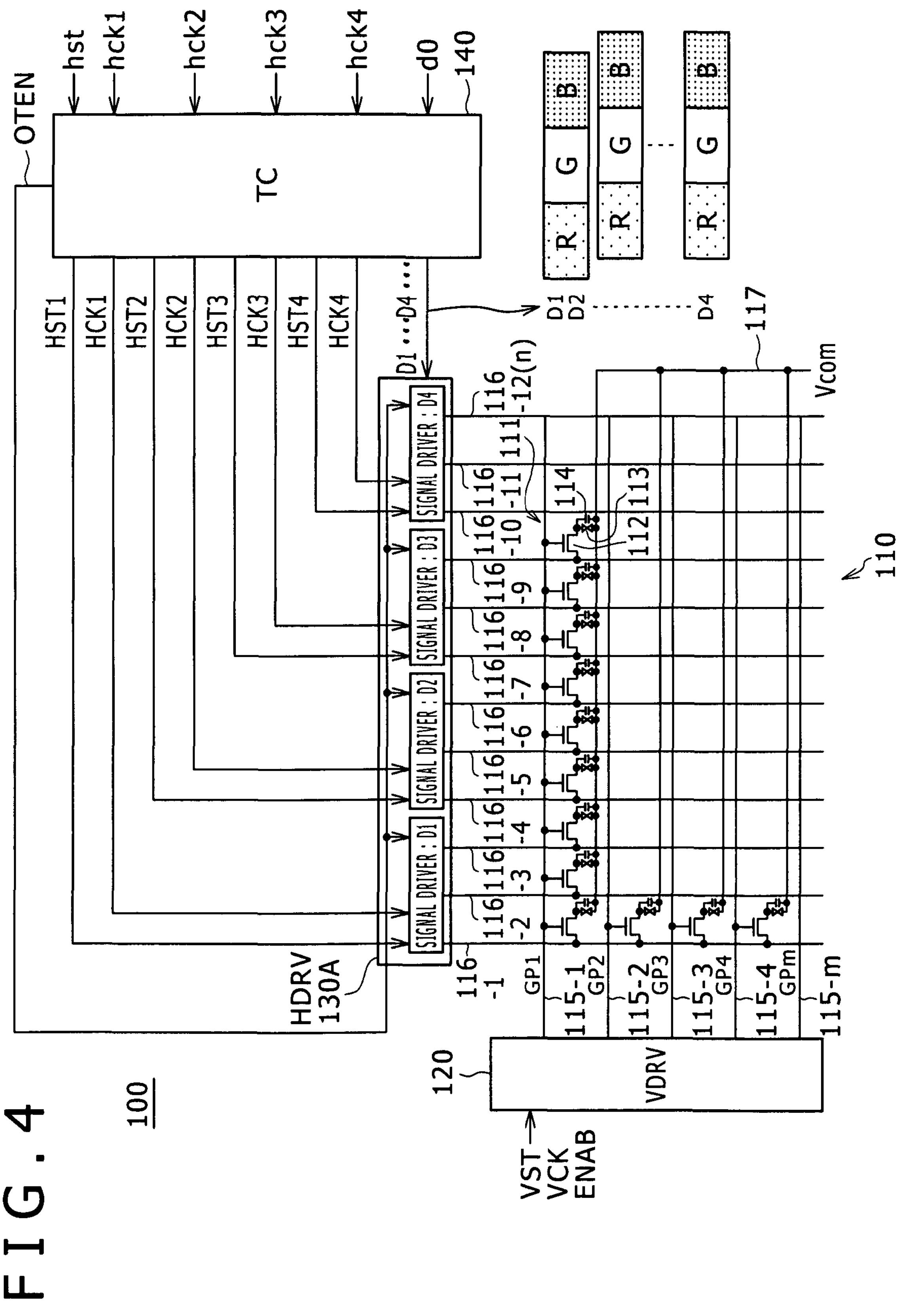
FIG. 4 is a block diagram illustrating a configuration example of a liquid crystal display device according to the embodiment of the present invention.
Figure 5:
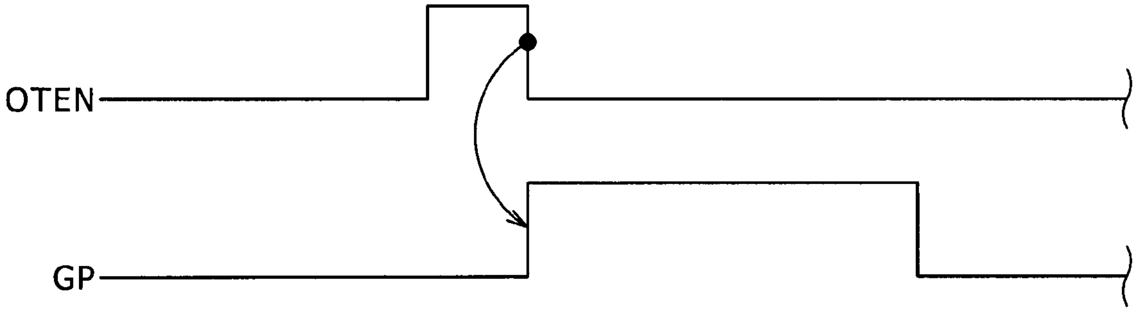
FIG. 5 is a waveform diagram illustrating the relationship between an output enable signal and gate pulse.

FIG. 4 is a block diagram illustrating a configuration example of a liquid crystal display device according to the embodiment of the present invention.

A liquid crystal display device 100 includes an effective pixel section 110, vertical driving circuit (VDRV) 120, horizontal driving circuit (HDRV) 130A, and multiphase clock data generator 140, as illustrated in FIG. 4.

The effective pixel section 110 has a plurality of pixel circuits 111 arranged in a matrix form.

Each of the pixel circuits 111 includes a thin film transistor (TFT) 112 serving as a switching element, liquid crystal cell 113, and holding capacitance (storage capacitance) 114. The liquid crystal cell 113 has its pixel electrode connected to the drain (or source) electrode of the TFT 112. The holding capacitance 114 has one of its electrodes connected to the drain electrode of the TFT 112.

Gate (scan) lines 115-1 to 115-*m* are disposed, one for each row of the pixel circuits 111, along the same circuits 111. Signal lines 116-1 to 116-*n* are disposed, one for each column of the pixel circuits 111, along the same circuits 111.

The TFTs 112 of the pixel circuits 111 in each row all have their gate electrodes connected to the same gate (scan) line (one of 115-1 to 115-*m*). The TFTs 112 of the pixel circuits 111 in each column all have their source (or drain) electrodes connected to the same signal line (one of 116-1 to 116-*n*).

Further, the liquid crystal cell 113 has its pixel electrode connected to the drain electrode of the TFT 112 and its opposed electrode connected to a common line 117. The holding capacitance 114 is connected between the drain electrode of the TFT 112 and the common line 117.

The common line 117 is applied with a given AC voltage as a common voltage Vcom from an unshown VCOM circuit, which is integrally formed with the driving and other circuits on a glass substrate.

Each of the pixel circuits 111 writes the pixel data to the holding capacitance 114 via the TFT 112 serving as a switching element. The liquid crystal cell 113 is modulated by a voltage based on the pixel data written to the holding capacitance 114. The liquid crystal display device 100 displays an image by controlling the transmittance of light passing through a pair of unshown polarizers with one disposed on the front and the other on the back of the liquid crystal cell 113.

The gate lines 115-1 to 115-*m* are all driven by the vertical driving circuit 120. The signal lines 116-1 to 116-*n* are all driven by the horizontal driving circuit 130A.

In response to a vertical start signal VST, vertical clock VCK, and enable signal ENAB, the vertical driving circuit 120 scans the pixel circuits 111 connected to the scan lines 115-1 to 115-*m* vertically at every field interval, sequentially selecting the same circuits 111 on a row-by-row basis.

That is, when a gate pulse GP1 is given to the gate line 115-1 by the vertical driving circuit 120, the pixels in the first row are selected. When a scan pulse GP2 is given to the gate line 115-2, the pixels in the second row are selected. Similarly, gate pulses GP3 to GPm are given respectively to the gate lines 115-3 to 115-*m*.

It should be noted that the vertical start signal VST, vertical clock VCK, and enable signal ENAB are generated by a separate unshown second timing controller different from a timing controller of the multiphase clock data generator 140.

The second timing controller operates in synchronism with the horizontal signals such as hst, hck1, hck2, hck3, hck4, and data d0 supplied to the multiphase clock data generator 140.

The vertical driving circuit 120 operates in synchronism with an output enable signal OTEN which enables the horizontal driving circuit 130A to output data to the signal lines 116-1 to 116-*n*.

The horizontal driving circuit 130A divides the signal lines into a plurality of groups (four groups in the present embodiment for simplification of the description). Signal drivers 131 to 134 are provided one for each group.

Figure 6:
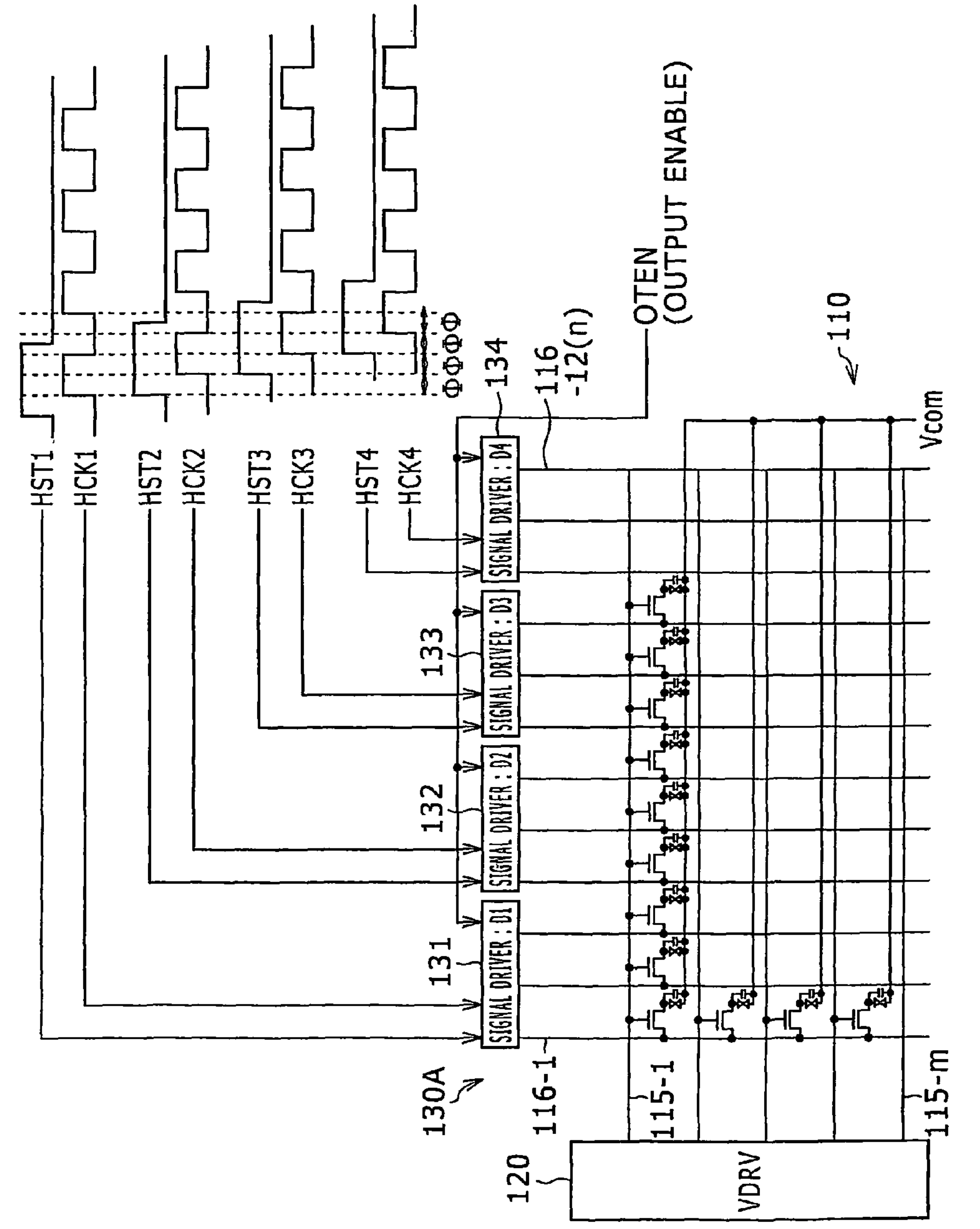
FIG. 6 is a diagram illustrating an example of drive pulses supplied to the signal drivers of the horizontal driving circuit.

FIG. 6 illustrates an example of drive pulses supplied to the signal drivers 131 to 134 of the horizontal driving circuit 130A.

In the present embodiment, the drive pulses are supplied separately to the signal drivers 131 to 134. Each of the drive pulses includes a horizontal start pulse HST and horizontal clock pulse HCK. The horizontal start pulse HST is used to instruct the start of a horizontal scan. The horizontal clock pulse HCK serves as a reference for a horizontal scan.

A horizontal start pulse HST2 supplied to the signal driver 132 is shifted (delayed) in phase by ¼ of a clock period from a horizontal start pulse HST1 supplied to the signal driver 131.

Similarly, a horizontal start pulse HST3 supplied to the signal driver 133 is shifted (delayed) in phase by ¼ of a clock period from the horizontal start pulse HST2 supplied to the signal driver 132.

A horizontal start pulse HST4 supplied to the signal driver 134 is shifted (delayed) in phase by ¼ of a clock period from the horizontal start pulse HST3 supplied to the signal driver 133.

The horizontal clock pulse HCK2 supplied to the signal driver 132 is shifted (delayed) in phase by ¼ of a clock period from the horizontal clock pulse HCK1 supplied to the signal driver 131.

Similarly, the horizontal clock pulse HCK3 supplied to the signal driver 133 is shifted (delayed) in phase by ¼ of a clock period from the horizontal clock pulse HCK2 supplied to the signal driver 132.

The horizontal clock pulse HCK4 supplied to the signal driver 134 is shifted (delayed) in phase by ¼ of a clock period from the horizontal clock pulse HCK3 supplied to the signal driver 133.

In the examples shown in FIGS. 4 and 6, the signal driver 131 generates a sampling pulse in response to the horizontal start pulse HST1 adapted to instruct the start of a horizontal scan and the horizontal clock pulse HCK1 serving as a reference for a horizontal scan. The horizontal start pulse HST1 and horizontal clock pulse HCK1 are supplied from the multiphase clock data generator 140.

The signal driver 131 sequentially samples input image data R (red), G (green), and B (blue) in response to the generated sampling pulse and supplies the data to the signal lines 116-1 to 116-3 as the data signal to be written to the pixel circuits 111.

The signal driver 132 generates a sampling pulse in response to the horizontal start pulse HST2 adapted to instruct the start of a horizontal scan and the horizontal clock pulse HCK2 serving as a reference for a horizontal scan. The horizontal start pulse HST2 and horizontal clock pulse HCK2 are supplied from the multiphase clock data generator 140.

The signal driver 132 sequentially samples the input image data R (red), G (green), and B (blue) in response to the generated sampling pulse and supplies the data to the signal lines 116-4 to 116-6 as the data signal to be written to the pixel circuits 111.

The signal driver 133 generates a sampling pulse in response to the horizontal start pulse HST3 adapted to instruct the start of a horizontal scan and the horizontal clock pulse HCK3 serving as a reference for a horizontal scan. The horizontal start pulse HST3 and horizontal clock pulse HCK3 are supplied from the multiphase clock data generator 140.

The signal driver 133 sequentially samples the input image data R (red), G (green), and B (blue) in response to the generated sampling pulse and supplies the data to the signal lines 116-7 to 116-9 as the data signal to be written to the pixel circuits 111.

The signal driver 134 generates a sampling pulse in response to the horizontal start pulse HST4 adapted to instruct the start of a horizontal scan and the horizontal clock pulse HCK4 serving as a reference for a horizontal scan. The horizontal start pulse HST4 and horizontal clock pulse HCK4 are supplied from the multiphase clock data generator 140.

The signal driver 134 sequentially samples the input image data R (red), G (green), and B (blue) in response to the generated sampling pulse and supplies the data to the signal lines 116-10 to 116-12 as the data signal to be written to the pixel circuits 111.

As described above, the present embodiment divides the plurality of signal lines into the plurality of groups in the horizontal driving circuit 130A. One of the plurality (four in the present embodiment) of signal drivers 131 to 134 is provided for each of the groups of the signal lines to convey the image data.

The horizontal start pulses HST1, HST2, HST3, and HST4 and horizontal clock pulses HCK1, HCK2, HCK3, and HCK4 are shifted in phase from each other. These pulses serve as drive pulses adapted to control the driving of the plurality of signal drivers 131 to 134.

More specifically, the data is fed in a divided manner to the signal drivers 131 to 134 adjacent to each other.

The signal drivers 131 to 134 are controlled by the horizontal clock pulses HCK1 to HCK4 and horizontal start pulses HST1 to HST4 having phases independent of each other. The image data is fed at timings synchronous with the independent clock and start pulses.

That is, as shown in FIGS. 4 and 6, the signal drivers 131 to 134 are operated by arbitrarily shifting the horizontal start pulse HST and horizontal clock pulse HCK in phase (by ¼ of a clock period in the present embodiment). The final image signal is output in synchronism with the output enable signal OTEN.

This makes it possible to drive the signal drivers

Normally, the clock frequency is 135 MHz in UXGA (1600×RGB×1200). Ordinary silicon ICs can operate at this frequency.

However, if the frame frequency is four times greater, then the clock frequency is 540 MHz. It is difficult for silicon ICs to operate at this high frequency.

Further, image signals generated at this frequency may not be easily conveyed to the liquid crystal device via a cable due to interference between signal wires. The frequency has to be reduced to overcome the above problem.

The present embodiment can maintain the image data clock while at the same time providing reduced frequency.

The multiphase clock data generator 140 will be described next.

The multiphase clock data generator 140 receives the horizontal start pulse hst and horizontal clock pulses hck1 to hck4, and it divides these pulses into a ¼ frequency. The horizontal start pulse hst and horizontal clock pulses hck1 to hck4 are supplied from the unshown graphics IC, for example, at a frequency four times higher than normal.

The multiphase clock data generator 140 supplies the horizontal start pulse HST1, derived from the frequency division, and the horizontal clock pulse HCK1 to the signal driver 131 of the horizontal driving circuit 130A. The horizontal clock pulse HCK1 is shifted (delayed) in phase by ¼ of a clock period from the horizontal start pulse HST1.

Further, the multiphase clock data generator 140 generates the horizontal start pulse HST2, which is shifted (delayed) in phase by ¼ of a clock period from the horizontal start pulse HST1. The same generator 140 supplies the horizontal start pulse HST2 and the horizontal clock pulse HCK2, derived from the frequency division, to the signal driver 132 of the horizontal driving circuit 130A. The horizontal clock pulse HCK2 is shifted (delayed) in phase by ¼ of a clock period from the horizontal start pulse HST2.

Still further, the multiphase clock data generator generates the horizontal start pulse HST3 which is shifted (delayed) in phase by ¼ of a clock period from the horizontal start pulse HST2. The same generator 140 supplies the horizontal start pulse HST3 and the horizontal clock pulse HCK3 derived from the frequency division to the signal driver 133 of the horizontal driving circuit 130A. The horizontal clock pulse HCK3 is shifted (delayed) in phase by ¼ of a clock period from the horizontal start pulse HST3.

Still further, the multiphase clock data generator 140 generates the horizontal start pulse HST4, which is shifted (delayed) in phase by ¼ of a clock period from the horizontal start pulse HST3. The same generator 140 supplies the horizontal start pulse HST4 and the horizontal clock pulse HCK4, derived from the frequency division, to the signal driver 134 of the horizontal driving circuit 130A. The horizontal clock pulse HCK4 is shifted (delayed) in phase by ¼ of a clock period from the horizontal start pulse HST4.

It should be noted that the time interval Φ by which the clock pulses are shifted in phase from each other is set so as to satisfy the relationship $\Phi \leqq (T/2)/N$, where (T/2) is the half period of the image clock and N the number of frequency divisions.

Still further, the multiphase clock data generator 140 arranges the supplied image data d0 into a line buffer. Then, the same generator 140 rearranges the image data, which has been subjected to the frequency division and arranged in the line memory buffer, into a plurality (four in the present embodiment) of line memory buffers independent of each other and then supplies the data to the signal drivers from the respective line memory buffer circuits.

Figure 7:
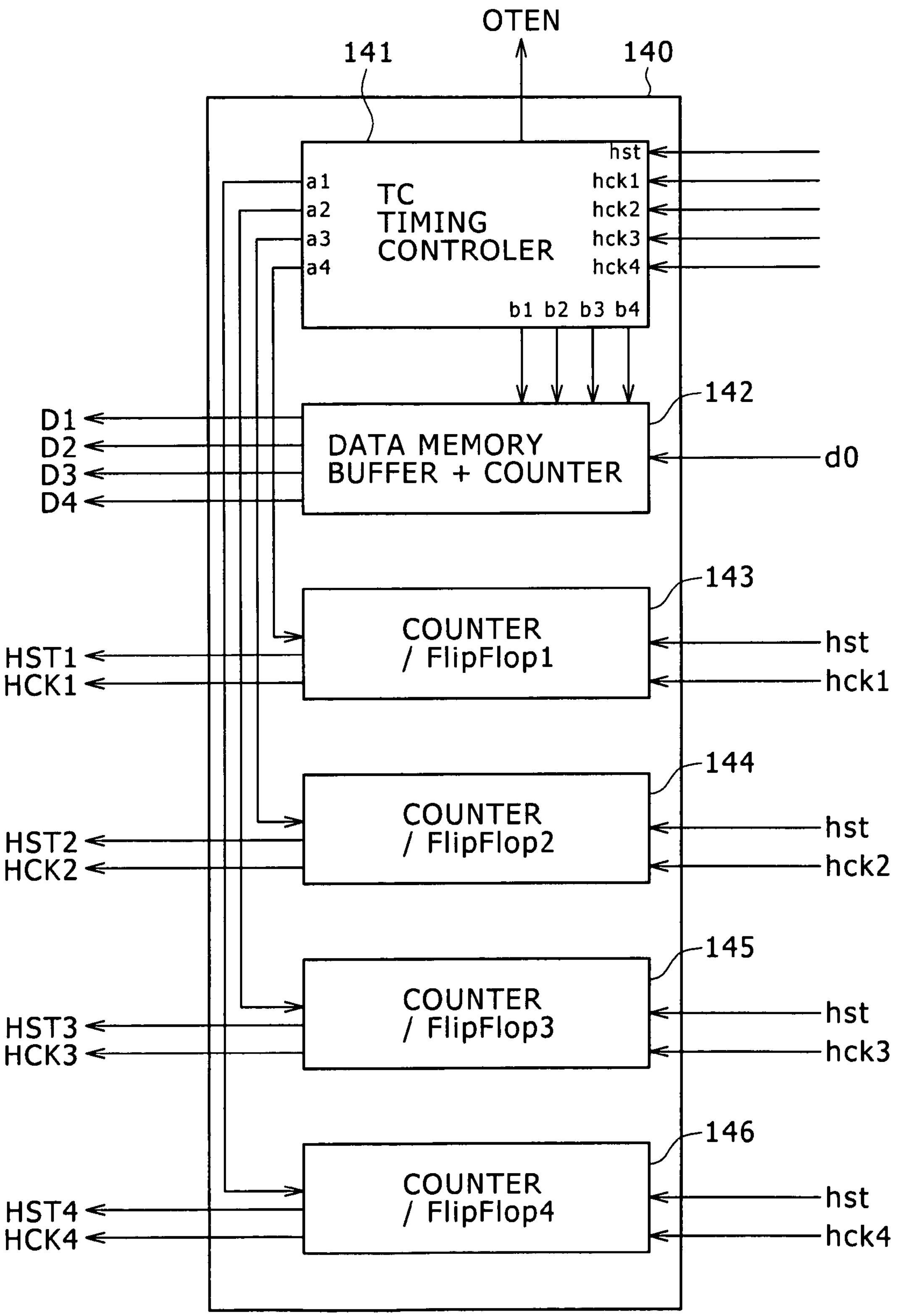
FIG. 7 is a diagram illustrating a specific configuration example of a multiphase clock data generator according to the present embodiment.

FIG. 7 is a diagram illustrating a specific configuration example of the multiphase clock data generator 140 according to the present embodiment.

Figure 8:
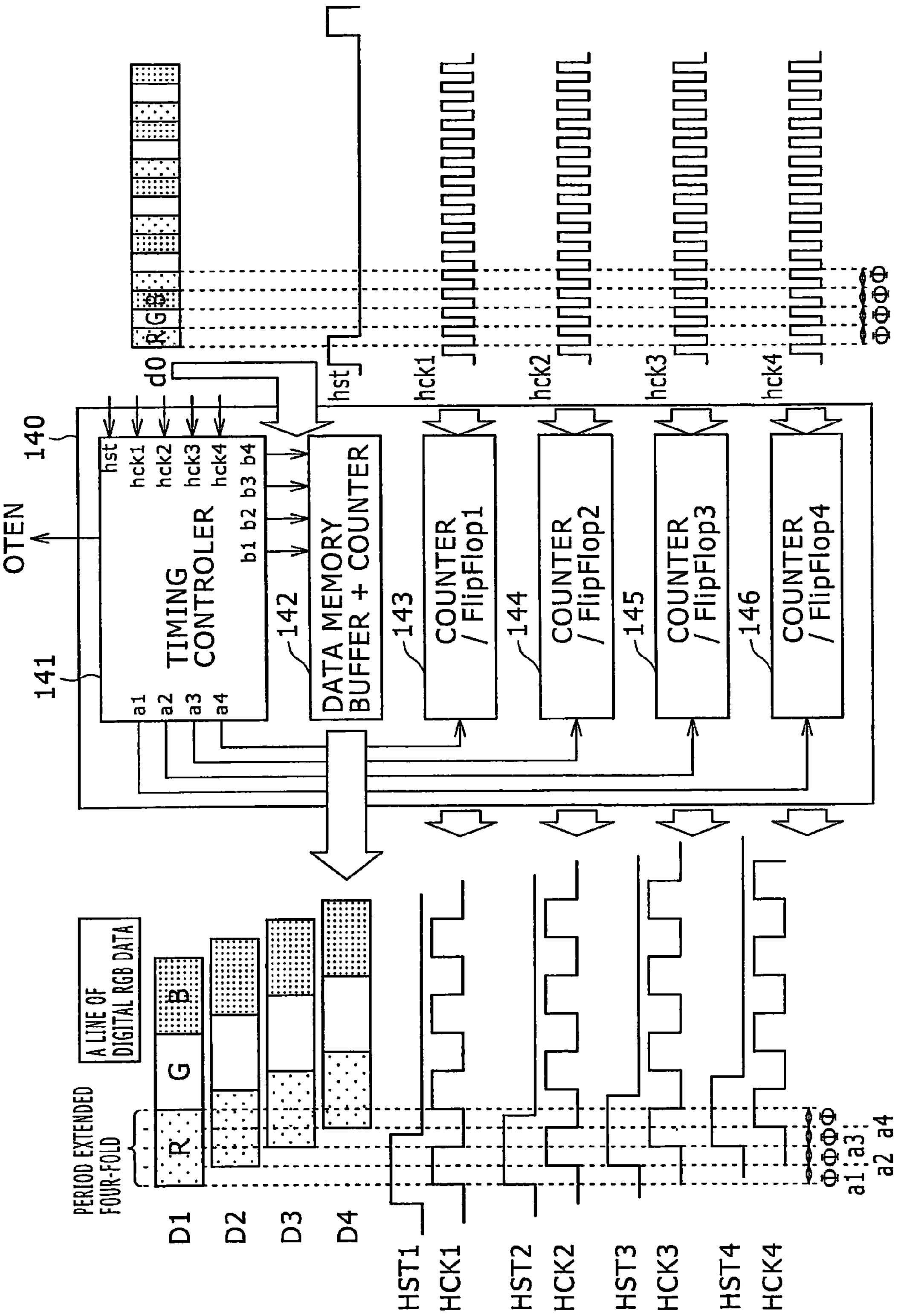
FIG. 8 is a diagram describing an example of data writing after timing control and frequency division by the multiphase clock data generator according to the present embodiment.

FIG. 8 is a diagram describing an example of data writing after timing control and frequency division by the multiphase clock data generator according to the present embodiment.

The multiphase clock data generator 140 includes a timing controller (TC) 141, data memory buffer counter 142, first counter flip-flop (CNT/FF) 143, second CNT/FF 144, third CNT/FF 145, and fourth CNT/FF 146.

In response to a horizontal start pulse hst1 and the horizontal clock pulses hck1 to hck4 at a frequency four times higher than normal, the timing controller 141 supplies trigger point signals a1 to a4 to the first to fourth CNT/FF 143 to 146. The trigger point signals a1 to a4 are shifted in phase by Φ from each other.

More specifically, the timing controller 141 supplies the trigger point signal a1 to the first CNT/FF 143. The same controller 141 supplies the trigger point signal a2, shifted in phase by Φ from the trigger point signal a1, to the second CNT/FF 144.

Further, the same controller 141 supplies the trigger point signal a3, shifted in phase by Φ from the trigger point signal a2, to the third CNT/FF 145. The same controller 141 supplies the trigger point signal a4, shifted in phase by Φ from the trigger point signal a3, to the fourth CNT/FF 146.

Further, in response to the horizontal start pulse hst1 and horizontal clock pulses hck1 to hck4 at a frequency four times higher than normal, the timing controller 141 supplies trigger point signals b1 to b4 to the data memory buffer counter 142. The trigger point signals b1 to b4 are shifted in phase by Φ from each other.

More specifically, the timing controller 141 supplies the trigger point signals b1 and b2 to the data memory buffer counter 142. The trigger point signal b2 is shifted in phase by Φ from the trigger point signal b1.

Further, the timing controller 141 supplies the trigger point signals b3 and b4 to the data memory buffer counter 142. The trigger point signal b3 is shifted in phase by Φ from the trigger point signal b2. The trigger point signal b4 is shifted in phase by Φ from the trigger point signal b3.

It should be noted that the timing controller 141 generates the trigger point signals a1 to a4 and b1 to b4 so that the signals are maintained in synchronism with each other.

The timing controller 141 generates the output enable signal OTEN serving as a horizontal interval control signal and outputs the signal to the horizontal driving circuit 130A and vertical driving circuit.

In response to the input data d0, the data memory buffer counter 142 extends the period of the data d0 four-fold in synchronism with the trigger point signals b1 to b4 from the timing controller 141. The same counter 142 rearranges the data d0 into pieces of data D1, D2, D3, D4, and so on and outputs these pieces of data. These pieces of data D1, D2, D3, D4, and so on are shifted in phase by Φ from each other. The rearranged pieces of data D1, D2, D3, D4, and so on are made up of the R (red), G (green), and B (blue) data.

The first CNT/FF 143 divides in frequency the horizontal start pulse hst and horizontal clock pulse hck1 in response to the trigger point signal a1.

The first CNT/FF 143 supplies the horizontal start pulse HST1 derived from the frequency division and horizontal clock pulse HCK1 to the signal driver 131 of the horizontal driving circuit 130A. The horizontal clock pulse HCK1 is shifted (delayed) in phase by ¼ of a clock period from the horizontal start pulse HST1.

The second CNT/FF 144 divides in frequency the horizontal start pulse hst and horizontal clock pulse hck2 in response to the trigger point signal a2. The second CNT/FF 144 also generates the horizontal start pulse HST2 which is shifted (delayed) in phase by ¼ of a clock period from the horizontal start pulse HST1.

The second CNT/FF 144 supplies the horizontal start pulse HST2 and horizontal clock pulse HCK2 to the signal driver 132 of the horizontal driving circuit 130A. The horizontal clock pulse HCK2, derived from the frequency division, is shifted (delayed) in phase by ¼ of a clock period from the horizontal start pulse HST2.

The third CNT/FF 145 divides in frequency the horizontal start pulse hst and horizontal clock pulse hck3 in response to the trigger point signal a3. The third CNT/FF 145 also generates the horizontal start pulse HST3 which is shifted (delayed) in phase by ¼ of a clock period from the horizontal start pulse HST2.

The third CNT/FF 145 supplies the horizontal start pulse HST3 and horizontal clock pulse HCK3 to the signal driver 133 of the horizontal driving circuit 130A. The horizontal clock pulse HCK3, derived from the frequency division, is shifted (delayed) in phase by ¼ of a clock period from the horizontal start pulse HST3.

The fourth CNT/FF 146 divides in frequency the horizontal start pulse hst and horizontal clock pulse hck4 in response to the trigger point signal a4. The fourth CNT/FF 146 also generates the horizontal start pulse HST4 which is shifted (delayed) in phase by ¼ of a clock period from the horizontal start pulse HST3.

The fourth CNT/FF 14.6 supplies the horizontal start pulse HST4 and horizontal clock pulse HCK4 to the signal driver 134 of the horizontal driving circuit 130A. The horizontal clock pulse HCK4, derived from the frequency division, is shifted (delayed) in phase by ¼ of a clock period from the horizontal start pulse HST4.

As described above, to display an image at a four-fold high frame rate, the multiphase clock data generator receives the horizontal clock pulses hck1 to hck4 at a frequency four times higher than normal and the horizontal driving start pulse hst which is in synchronism with the horizontal clock pulses hck1 to hck4, as illustrated in FIG. 8.

The timing controller 141 generates the trigger point signals b1 to b4 from the horizontal clock pulses hck1 to hck4 and the start pulse hst. In response to the trigger point signals b1 to b4, the data memory buffer counter 142 stores the horizontal image data of one horizontal interval and rearranges the data so as to suit the signal drivers 131 to 134, which are arranged independently of each other.

Here, output and input data intervals in one horizontal interval are shown. These intervals allow for the processing of the data.

Here, T denotes the period of the horizontal clock pulses HCK serving as the control clocks of the signal drivers (ICs); T1 denotes the data interval in one horizontal interval after frequency division into a ¼ frequency; T2 denotes the data interval in one horizontal interval; and T3 denotes one horizontal interval.

The following relationship holds between the above intervals.

$$T3 \geqq T1 \geqq T2$$

That is, the data interval T1 in one horizontal interval after frequency division into a ¼ frequency is longer than the original data interval T2 in one horizontal interval at a high frequency before frequency division into a ¼ frequency, but shorter than the horizontal interval T3.

This relationship has to be satisfied to satisfy the timing diagram which provides the distinctive functions of the present embodiment.

Further, as illustrated in FIGS. 7 and 8, the CNT/FFs 143 to 146, independent of each other, generate the horizontal clock pulses HCK1 to HCK4 and horizontal start pulses HST1 to HST4 shifted in phase from each other and supplied to the signal drivers 131 to 134 of the present embodiment.

The image clock pulse hck and start pulse hst serving as a synchronizing signal are fed to each of the CNT/FFs 143 to 146 from the original video source.

These pulses are divided in frequency under control of the timing controller 141. Further, the image data d0, which is fed at the same time, is also divided in frequency and arranged in the data memory buffer counter 142. Then, the image data d0 is rearranged into the four independent pieces of data D1 to D4.

As a result, the CNT/FFs 143 to 146, namely line memory buffers 143 to 146, can supply independent outputs to the signal drivers.

In addition, the data can be shifted in phase using the frequency-divided clocks in accordance with the divided frequency.

As described above and shown by reference numeral Y in FIG. 9, the horizontal clock pulse HCK1 is shifted in phase from the horizontal clock pulse HCK2. As a result, the horizontal clock pulse HCK1 is affected merely by the noise NIS of the horizontal clock pulse HCK2.

Similarly, the horizontal clock pulse HCK2 is affected merely by the noise NIS of the horizontal clock pulse HCK3.

That is, there will be less noise resulting from the superposition of the potentials of the horizontal clock pulses HCK1, HCK2, HCK3, and HCK4 caused by the synchronizing signals.

Figure 9:
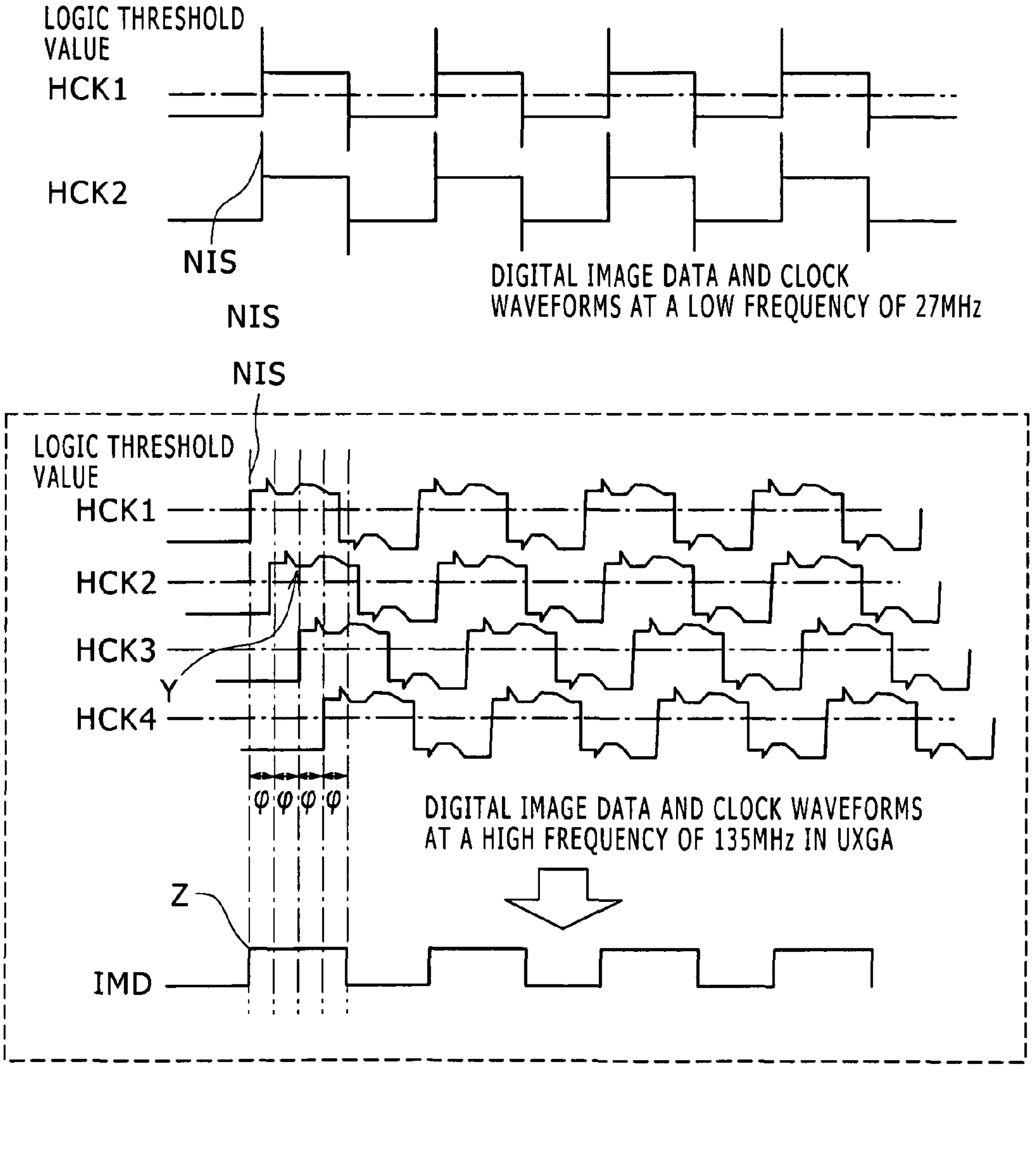
FIG. 9 is a diagram describing the effect of the present embodiment.

Therefore, the image data IMD after shaping by the unshown buffer circuits of the signal drivers 131 to 134 exhibits a normal rectangular waveform free from error portions, as shown by reference numeral Z in FIG. 9.

The time interval Φ by which the clock pulses are shifted in phase from each other is equal to a half period of the image clock divided by the number of frequency divisions N, which is an integer, or less.

This relationship can be expressed by $\Phi \leqq (T/2)/N$.

The operation of the liquid crystal display device 100 configured as described above will be described with reference to FIGS. 4 and 8.

As illustrated in FIG. 4, the vertical driving circuit 120 sequentially selects the pixel circuits 111 on a row-by-row basis in response to the vertical start signal VST, vertical clock VCK, and enable signal ENAB, as illustrated in FIG. 4. In response to the respective signals, the vertical driving circuit 120 scans the pixel circuits 111 connected to the scan lines 115-1 to 115-*m* vertically every field interval, sequentially selecting the same circuits 111 on a row-by-row basis.

The multiphase clock data generator 140 receives the horizontal start pulse hst and horizontal clock pulses hck1 to hck4 and divides these pulses into a ¼ frequency. The horizontal start pulse hst and horizontal clock pulses hck1 to hck4 are supplied from the unshown graphics IC, for example, at a frequency four times higher than normal.

The multiphase clock data generator 140 supplies the horizontal start pulse HST1 derived from the frequency division and the horizontal clock pulse HCK1 to the signal driver 131 of the horizontal driving circuit 130A. The horizontal clock pulse HCK1 is shifted (delayed) in phase by ¼ of a clock period from the horizontal start pulse HST1.

Similarly, the multiphase clock data generator 140 generates the horizontal start pulse HST2, which is shifted (delayed) in phase by ¼ of a clock period from the horizontal start pulse HST1.

The same generator 140 supplies the horizontal start pulse HST2 and the horizontal clock pulse HCK2, derived from the frequency division, to the signal driver of the horizontal driving circuit 130A. The horizontal clock pulse HCK2 is shifted (delayed) in phase by ¼ of a clock period from the horizontal start pulse HST2.

Further, the multiphase clock data generator 140 generates the horizontal start pulse HST3, which is shifted (delayed) in phase by ¼ of a clock period from the horizontal start pulse HST2.

The same generator 140 supplies the horizontal start pulse HST3 and the horizontal clock pulse HCK3, derived from the frequency division, to the signal driver 133 of the horizontal driving circuit 130A. The horizontal clock pulse HCK3 is shifted (delayed) in phase by ¼ of a clock period from the horizontal start pulse HST3.

Still further, the multiphase clock data generator 140 generates the horizontal start pulse HST4, which is shifted (delayed) in phase by ¼ of a clock period from the horizontal start pulse HST3.

The same generator 140 supplies the horizontal start pulse HST4 and the horizontal clock pulse HCK4, derived from the frequency division, to the signal driver 134 of the horizontal driving circuit 130A. The horizontal clock pulse HCK4 is shifted (delayed) in phase by ¼ of a clock period from the horizontal start pulse HST4.

Still further, the multiphase clock data generator 140 arranges the supplied image data d0 into a line buffer. Then, the same generator 140 rearranges the image data, which has been subjected to the frequency division and arranged in the line memory buffer, into a plurality (four in the present embodiment) of line memory buffers independent of each other and then supplies the data to the signal drivers from the respective line memory buffer circuits (FIG. 8).

The signal driver 131 generates a sampling pulse in response to the horizontal start pulse HST1 adapted to instruct the start of a horizontal scan and the horizontal clock pulse HCK1 serving as a reference for a horizontal scan. The horizontal start pulse HST1 and horizontal clock pulse HCK1 are supplied from the multiphase clock data generator 140.

Further, the signal driver 131 sequentially samples the input image data R (red), G (green), and B (blue) in response to the generated sampling pulse.

The signal driver 131 supplies the data, in synchronism with the output enable signal OTEN, to the signal lines 116-1 to 116-3 as the data signal to be written to the pixel circuits 111.

Similarly, the signal driver 132 generates a sampling pulse in response to the horizontal start pulse HST2 adapted to instruct the start of a horizontal scan and the horizontal clock pulse HCK2 serving as a reference for a horizontal scan. The horizontal start pulse HST2 and horizontal clock pulse HCK2 are shifted in phase respectively from the horizontal start pulse HST1 and horizontal clock pulse HCK1.

Further, the signal driver 132 sequentially samples the input image data R (red), G (green), and B (blue) in response to the generated sampling pulse.

The signal driver 132 supplies the data, in synchronism with the output enable signal OTEN, to the signal lines 116-4 to 116-6 as the data signal to be written to the pixel circuits 111.

The signal driver 133 generates a sampling pulse in response to the horizontal start pulse HST3 adapted to instruct the start of a horizontal scan and the horizontal clock pulse HCK3 serving as a reference for a horizontal scan. The horizontal start pulse HST3 and horizontal clock pulse HCK3 are shifted in phase respectively from the horizontal start pulse HST2 and horizontal clock pulse HCK2.

Further, the signal driver 133 sequentially samples the input image data R (red), G (green), and B (blue) in response to the generated sampling pulse.

The signal driver 133 supplies the data, in synchronism with the output enable signal OTEN, to the signal lines 116-7 to 116-9 as the data signal to be written to the pixel circuits 111.

The signal driver 134 generates a sampling pulse in response to the horizontal start pulse HST4 adapted to instruct the start of a horizontal scan and the horizontal clock pulse HCK4 serving as a reference for a horizontal scan. The horizontal start pulse HST4 and horizontal clock pulse HCK4 are shifted in phase respectively from the horizontal start pulse HST3 and horizontal clock pulse HCK3.

Further, the signal driver 134 sequentially samples the input image data R (red), G (green), and B (blue) in response to the generated sampling pulse.

The signal driver 134 supplies the data, in synchronism with the output enable signal OTEN, to the signal lines 116-10 to 116-12 as the data signal to be written to the pixel circuits 111.

It should be noted that the vertical driving circuit 120 can output a gate pulse in response to the output enable signal OTEN at the trailing edge of the same signal OTEN changing from active high level to inactive low level. The same signal OTEN enables the horizontal driving circuit 130A to output data to the signal lines 116-1 to 116-*n*.

As described above, the present embodiment divides the plurality of signal lines into the plurality of groups. For each of the groups, one of the plurality of signal drivers 131 to 134 is provided, which are adapted to convey the image data supplied to the signal lines.

The horizontal start pulses HST1, HST2, HST3, and HST4 and horizontal clock pulses HCK1, HCK2, HCK3, and HCK4 are shifted in phase from each other. These pulses serve as drive pulses adapted to control the driving of the plurality of signal drivers 131 to 134.

The signal drivers 131 to 134 are controlled by the horizontal clock pulses HCK1 to HCK4 and the horizontal start pulses HST1 to HST4 having phases independent of each other. The image data is fed at timings synchronous with the independent clock and start pulses.

In the present embodiment, the signal drivers 131 to 134 are operated by arbitrarily shifting the horizontal start pulse HST and the horizontal clock pulse HCK in phase. The final image signal is output in synchronism with the output enable signal OTEN.

This makes it possible to drive the signal drivers with the clock pulses, start pulses, and image data at a lower-than-original frequency.

As a result, high resolution images can be transferred at high speed without any image quality degradation.

Further, a high-frame-rate image provides significantly improved moving image characteristics of the display device as compared to an image at an existing frame frequency, thus eliminating image rolling.

Still further, image signal drivers, which can operate at a normal clock frequency, can be used, and thus allowing for the manufacturing of the display device at a low cost. There is no need to use specially designed high-speed image signal drivers.

Figure 10:
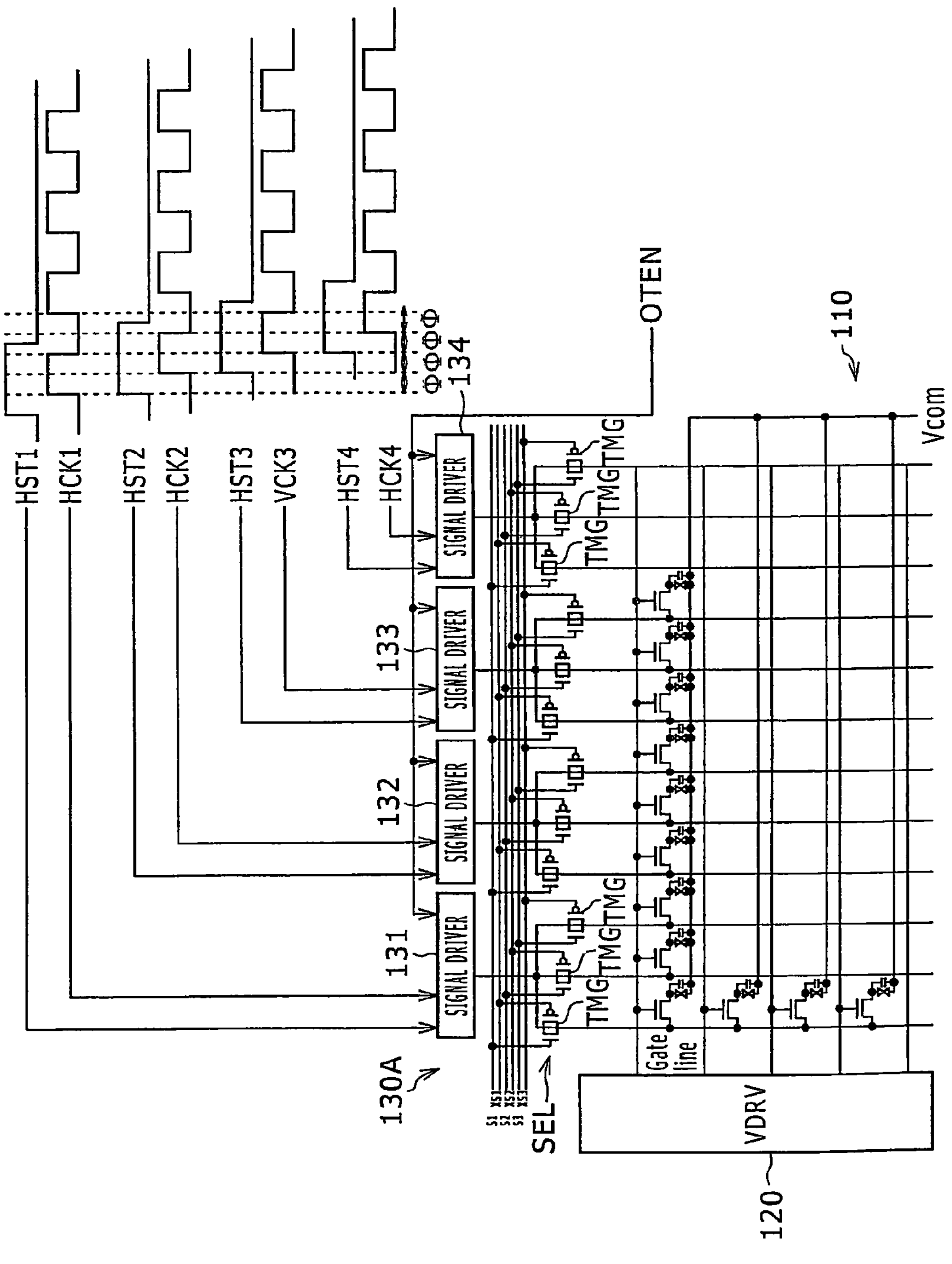
FIG. 10 is a block diagram illustrating a configuration example of the liquid crystal display device according to the embodiment of the present invention using time division switches.

It should be noted that the embodiment of the present invention is also effective when image data is written to the panel in a time-divided manner. The embodiment of the present invention is applicable when time division switches are used, as illustrated in FIG. 10. Particularly, if the number of time divisions fails to sufficiently meet the electrical and image characteristics within a horizontal selection interval.

In this case, as described above, the signal drivers divide the input frequency of the clock pulses (control pulses), start pulses, and image data.

In FIG. 10, a signal SV from the signal drivers 131 to 134 is transmitted to the signal lines 116 (116-1 to 116-12) via selectors SEL, each having a plurality of transfer gates TMG.

The transfer gates TMG (analog switches) are controlled in conduction by a select signal S1, inverted signal XS1 thereof, select signal S2, inverted signal XS2 thereof, select signal S3, inverted signal XS3 thereof, and so on.

As described above, a high-definition (UXGA) and high-frame rate active matrix display device can use selector time division driving, which ensures a reduced number of connection terminals and improves reliability in mechanical connections.

It should be noted that CMOS signaling, LVDS (Low Voltage Differential Signaling), or TMDS (Transition Minimized Differential Signaling) can be used to transfer digital data used in the present embodiment. These transfer schemes are used on the input and output sides of the multiphase clock data generator 140.

An active matrix display device, and typically an active matrix liquid crystal display device, is used as a display of OA equipment, such as a personal computer, a word processor, and a television set. In addition, the present display device is suitable particularly for use as a display section of electronic equipment, such as a combined mobile phone and PDA, whose main body is becoming increasingly small and compact.

That is, the liquid crystal display device 100 according to the present embodiment is applicable to a variety of electronic equipment illustrated in FIGS. 11A to 11G.

For example, the same device 100 is applicable as a display device of electronic equipment across all fields, including: a digital cameras, laptop personal computers, mobile phones, and video camcorder. These pieces of equipment are designed to display an image or video of a video signal fed to or generated inside the electronic equipment.

Examples of the aforementioned electronic equipment to which the embodiment of the present invention is applied will be shown below.

Figures 11A, 11B, 11C, 11D, 11E, 11F, 11G:
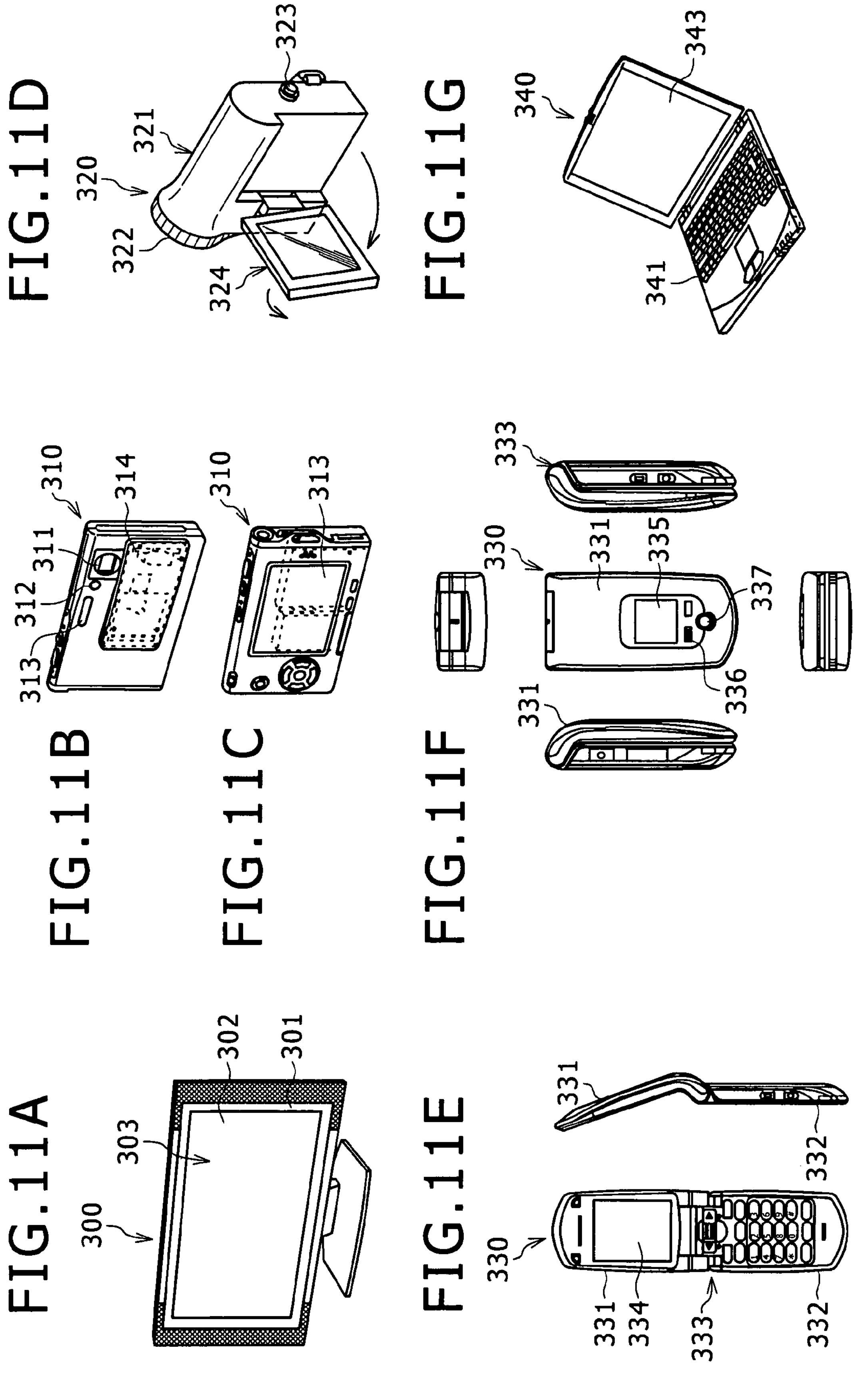
FIGS. 11A to 11G are views illustrating examples of electronic equipment using the display device according to the present embodiment.

FIG. 11A illustrates, as an example, a television set 300 to which the embodiment of the present invention is applied. The television set 300 includes a video display screen 303 made up, for example, of a front panel 301, filter glass 302, and other parts. The television set is manufactured by using the display device according to the embodiment of the present invention as the video display screen 303.

FIGS. 11B and 11C illustrate, as an example, a digital camera 310 to which the embodiment of the present invention is applied. The digital camera 310 includes an imaging lens 311, flash-emitting section 312, display section 313, control switch 314, and other parts. The digital camera is manufactured by using the display device according to the embodiment of the present invention as the display section 313.

FIG. 11D illustrates a video camcorder 320 to which the embodiment of the present invention is applied. The video camcorder 320 includes a main body section 321, lens 322 provided on the front-facing side surface to image the subject, imaging start/stop switch 323, display section 324, and other parts. The video camcorder is manufactured by using the display device according to the embodiment of the present invention as the display section 324.

FIGS. 11E and 11F illustrate a mobile terminal device 330 to which the embodiment of the present invention is applied. The mobile terminal device 330 includes an upper enclosure 331, lower enclosure 332, connecting section (hinge section in this example) 333, display 334, subdisplay 335, picture light 336, camera 337, and other parts. The mobile terminal device is manufactured by using the display device according to the embodiment of the present invention as the display 334 and subdisplay 335.

FIG. 11G illustrates a laptop personal computer 340 to which the embodiment of the present invention is applied. The laptop personal computer 340 includes, in a main body 341, a keyboard 342 adapted to be manipulated for entry of text or other information, a display section 343 adapted to display an image, and other parts. The laptop personal computer is manufactured by using the display device according to the embodiment of the present invention as the display section 343.

It should be noted that the above embodiments have been described by taking, as examples, cases in which the embodiment of the present invention is applied to an active matrix liquid crystal display device. However, the embodiment of the present invention is not limited thereto, but it is similarly applicable to other active matrix display devices, such as electro luminescence (EL) display device using an EL elements as an electro-optical element of each of the pixels.

It should be understood by those skilled in the art that various modifications, combinations, sub-combinations, and alterations may occur depending on design requirements and other factors in so far as they are within the scope of the appended claims or the equivalents thereof.

What is claimed is:

1. A display device comprising:

a pixel section having pixel circuits arranged to form a matrix with at least a plurality of columns, pixel data being written to each of the pixel circuits via a switching element;

at least one scan line disposed to be associated with rows of the pixel circuits and configured to control the conduction of the switching elements;

a plurality of signal lines disposed to be associated with columns of the pixel circuits and configured to convey the pixel data;

a horizontal driving circuit having a plurality of signal drivers, the plurality of signal drivers being associated with a plurality of groups into which the signal lines are divided, and being configured to convey image data supplied to the signal lines, wherein each of the plurality of signal drivers conveys the image data to the associated signal line in response to a separate drive pulse, and the drive pulses supplied to the signal drivers are shifted in phase from each other;

a multiphase clock data generator that includes a plurality of counter flip-flops configured to receive trigger points signals shifted in phase from a timing controller in order to divide in frequency the drive pulse at a higher-than-normal frequency so as to supply the drive pulses shifted in phase from each other to the signal drivers; and said multiphase clock data generator being configured to divide the image data and to rearrange the divided pieces of data into a data arrangement suitable for input to the signal drivers.

2. The display device of claim 1, wherein data is fed in a divided manner to the signal drivers adjacent to each other, and the image data is fed to the signal drivers at timings synchronous with the drive pulses.

3. The display device of claim 1, wherein the multiphase clock data generator supplies the independent drive pulses, shifted in phase from each other, respectively to the signal drivers, and the drive pulses each include a clock pulse and start pulse.

4. The display device of claim 2, wherein the multiphase clock data generator supplies the independent drive pulses, shifted in phase from each other, respectively to the signal drivers, and the drive pulses each include a clock pulse and start pulse.

5. The display device of claim 2, wherein a time interval $\Phi$ by which the drive pulses are shifted in phase from each other is set so as to satisfy the relationship $\Phi \leqq (T/2)/N$, where $(T/2)$ is the half period of an image clock and N the number of frequency divisions.

6. The display device of claim 4, wherein a time interval $\Phi$ by which the drive pulses are shifted in phase from each other is set so as to satisfy the relationship $\Phi \leqq (T/2)/N$, where $(T/2)$ is the half period of an image clock and N the number of frequency divisions.

7. The display device of any one of claims 1 comprising:

a selector switch disposed between each of the signal drivers and its associated signal line, the selector switch configured to select the image data in a time-divided manner.

8. A driving method of a display device comprising the steps of:

disposing a pixel section having pixel circuits arranged to form a matrix with at least a plurality of columns, pixel data being written to each of the pixel circuits via a switching element;

disposing at least one scan line to be associated with rows of the pixel circuits and configured to control the conduction of the switching elements;

disposing a plurality of signal lines to be associated with columns of the pixel circuits and configured to convey the pixel data;

disposing a horizontal driving circuit having a plurality of signal drivers, the plurality of signal drivers associated with a plurality of groups into which the signal lines are divided, and configured to convey the image data supplied to the signal lines;

supplying the independent drive pulses, shifted in phase from each other, respectively to the signal drivers;

causing each of the signal drivers to convey the image data to the associated signal line in response to the drive pulse received;

generating multiphase clock data by including a plurality of counter flip-flops that receive trigger points signals shifted in phase from a timing controller in order to divide in frequency the drive pulse at a higher-than-normal frequency so as to supply the drive pulses shifted in phase from each other to the signal drivers; and generating multiphase clock data by dividing the image data and rearranging the divided pieces of data into a data arrangement suitable for input to the signal drivers.

9. Electronic equipment having a display device, the display device comprising:

a pixel section having pixel circuits arranged to form a matrix with at least a plurality of columns, pixel data being written to each of the pixel circuits via a switching element;

at least one scan line disposed to be associated with rows of the pixel circuits and configured to control the conduction of the switching elements;

a plurality of signal lines disposed to be associated with columns of the pixel circuits and configured to convey the pixel data; and a horizontal driving circuit having a plurality of signal drivers, the plurality of signal drivers being associated with a plurality of groups into which the signal lines are divided, and being configured to convey image data supplied to the signal lines, wherein each of the plurality of signal drivers conveys the image data to the associated signal line in response to a separate drive pulse, and the drive pulses supplied to the signal drivers are shifted in phase from each other;

a multiphase clock data generator that includes a plurality of counter flip-flops configured to receive trigger points signals shifted in phase from a timing controller in order to divide in frequency the drive pulse at a higher-than-normal frequency so as to supply the drive pulses shifted in phase from each other to the signal drivers; and said multiphase clock data generator being configured to divide the image data and to rearrange the divided pieces of data into a data arrangement suitable for input to the signal drivers.

* * * * *